April 18, 1967  J. G. LEWIS  3,314,734
PNEUMATIC CONVEYORS
Filed Sept. 17, 1965
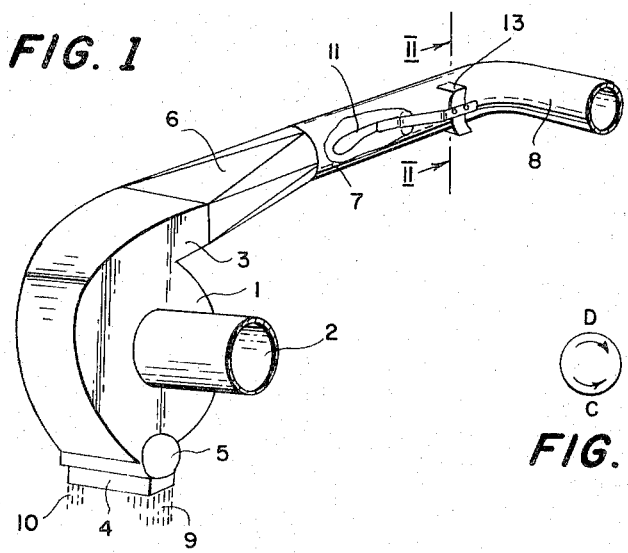
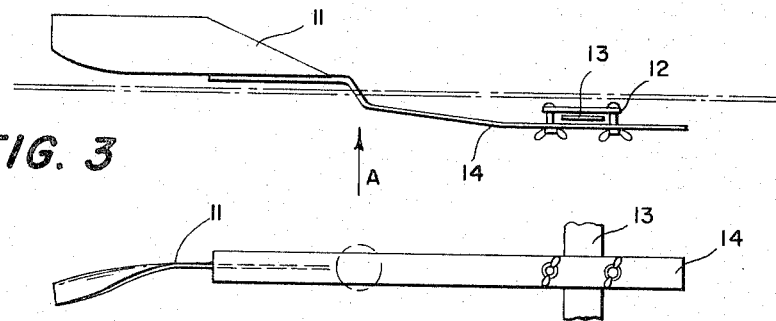
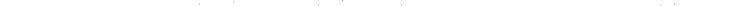
INVENTOR
JOHN G. LEWIS
BY Larson and Taylor
ATTORNEYS United States Patent Office 3,314,734
Patented Apr. 18, 1967

3,314,734
PNEUMATIC CONVEYORS
James G. Lewis, Wrington, Somerset, England, assignor to The Imperial Tobacco Company (of Great Britain and Ireland), Limited, Bristol, England, a company of England
Filed Sept. 17, 1965, Ser. No. 488,173
9 Claims. (Cl. 302—64)

This invention concerns pneumatic conveyors that is to say piping through which solid matter, e.g. tobacco leaves or cut tobacco, is conveyed by an air stream.

Pneumatic conveyors provide a convenient means for transferring solid matter from one position to another because the piping can readily be bent to avoid machines and other objects between said positions.

In many instances it is desirable to deliver the matter in an orderly manner. For example a pneumatic conveyor may be used to convey tobacco via a cyclone for example a tangential separator, that separates the tobacco from the air stream, to a moving conveyor, e.g. an endless band, and it is desirable to deliver the tobacco onto the band in an orderly manner that is to say to delever it evenly throughout the width of the band.

A tangential separator is a cyclone of the kind in which the air carrying the solid matter is directed tangentially into the substantially cylindrical body of the cyclone and is extracted through a duct near the centre of the cylinder thus permitting the separated solid matter, which is carried in the rotating mass of air tangentially around the body, to be delivered through an orifice at the perimeter of the body.

In another example the tobacco as leaves or pieces of leaf may be carried by a pneumatic conveyor to a machine in which said leaves or pieces are threshed so as to separate and remove the stems. In this case it is desirable to deliver the tobacco to the machine evenly throughout its width.

It has been found that in any pneumatic feed pipe through which solid matter is conveyed there is a tendency for eddies to be set up downstream from any bends in the pipe, for example a horizontal right angled bend, and this results in the conveyed material being unevenly distributed in the pipe downstream of the bend and hence being unevenly distributed across the surface of a subsequent moving conveyor, or across the width of a subsequent machine.

It is an object of the present invention to control the air flow in a pneumatic conveyor when said conveyor involves a bend or bends so that material being conveyed therethrough will be delivered from the pipe in an orderly manner.

According to one feature, the present invention consists in an air directing vane for mounting in the feed pipe of a pneumatic conveyor in which eddy currents arise in the air stream, said vane being adapted to be directed in a manner such as to counteract any such currents, whereby the air stream acts to deliver material conveyed thereby in an orderly manner at its destination.

According to a further feature the present invention consists in a pneumatic conveyor, having a bend or bends that tends to set up eddy currents downstream thereof, wherein an air directing vane is mounted and is directed in a manner such as to counteract said current thereby delivering material carried in the air stream in an orderly manner at its destination.

According to a still further feature the present invention consists in a pneumatic conveyor for directing material tangentially into a tangential separator that acts to separate the solid matter from the air stream and deliver the former to a moving conveyor, a bend in the pneumatic conveyor that tends to set up an eddy current in the air stream, and an air directing vane in the pneumatic conveyor adapted to counteract the eddy current whereby material carried therethrough by the air stream is delivered in an orderly manner.

Forms of apparatus in accordance with the present invention will now be described with reference to the accompanying drawings in which:

FIG. 1 is a perspective view of a tangential separator, including a horizontal feed pipe for feeding solid matter in a horizontal plane in an air stream to the separator, this pipe having in it a bend some distance up stream.

FIG. 2 is a cross section of the feed pipe on the line 2—2 of FIG. 1.

FIG. 3 is an enlarged view of an air directing vane.

FIG. 4 is a view in the direction of the arrow A in FIG. 3.

FIG. 5 illustrates an embodiment of the invention in which the pneumatic conveyor leads to a machine for threshing tobacco leaves.

Referring to FIG. 1, the tangential separator comprises a cylindrical body 1 having a central air duct 2 adapted to be connected to a fan not shown. An entry orifice 3 extends across the width of the body and a delivery orifice 4 is located at the bottom. 5 is a gate valve to permit delivery of solid matter as it rotates.

The rectangular entry orifice 3 is connected by a transformation piece 6 to a circular pipe 7 and in the drawings, the pipe 7 is bent horizontally at 8, where by means of trunking not shown it connects to a supply of the material to be transported.

The interior of the body 1 includes means for directing the air entering the body out through the duct 2 whilst the solid material is carried tangentially around the body to the gate valve 5 and thence to the delivery orifice 4.

The orifice through which the solid matter is delivered from a tangential separator is of appreciable size, e.g. 3 feet long by 6 inches wide and there is a tendency under some conditions of air flow to deliver the matter unevenly throughout the length of the orifice, thus it will be seen in FIG. 1 that the solid material is shown as being delivered unevenly in that more is delivered at one end 9 of the orifice 4 than at the other end 10.

It is thought that the reason for this is that as the material passes round the bend 8, the air sets up a pressure gradient in the pipe 8 due to the centrifugal force, with pressure high on the outside of the bend. The air velocity is less at the pipe walls than in the centre due to friction. As a consequence the pressure gradient at the top and bottom at the horizontal bend 8 is less than that across the horizontal diameter.

The result of this is to set up a double vortex in the pipe downstream from the bend 8 as shown by the arrows C, D in FIG. 2.

The material tends to fall to the bottom of the pipe and is therefore swept towards the inside of the bend 8 by the bottom vortex (arrow C in FIG. 2).

In accordance with the present invention an air directing vane 11 is mounted within the pipe 7 and is directed (e.g. bent longitudinally and twisted laterally) so as to counteract the eddy currents indicated by the lower arrow in FIG. 2.

Referring to FIGS. 3 and 4, the vane 11 is attached to a bar 14.

The outer end of the bar 14 is clamped by the clamp 12 to a fixed member 13 mounted on the outside of the pipe 7, to provide means of securing the vane 11 at an appropriate angle after adjustment. The fixed member 13 is preferably bent to a radius equal to that of the duct 7 and mounted convex towards the duct.

The vane 11 is preferably shaped as shown in FIG. 5 so as to avoid both catching solid material on its leading edge and jamming of solid material between its edges and the wall of the pipe 7. The vane 11 is bent longitudinally and is twisted laterally as illustrated in FIG. 4 but the degree of bending and twisting is adjusted according to the manner in which the solid material is delivered initially from the orifice 4. After a trial of the separator, coarse adjustments are made by this means in such a manner that roughly even delivery of the material is effected. Fine adjustments may then be made by moving the bar 14 on the fixed member 13.

In FIG. 1, a portion of the wall of the pipe 7 is broken away to show a convenient position for mounting the vane, though its exact position is not critical.

The drawings do not provide dimensions of the various parts of the apparatus but the location of the vane 11 2 feet to 3 feet upstream of the transformation piece 6 when the pipe 7 is 12 inches to 15 inches diameter has been found suitable.

In the case that the bend 8 leads directly into the transformer 6 a vane 11 placed upstream of the bend but generating an opposite hand swirl was successful in providing even delivery. In this case delivery had previously been heavy towards the outside of the bend.

In another instance the feed pipe included a vertical bend leading into the transformation piece. In this case a vane located upstream of the vertical bend and about 15 pipe diameters upstream of the separator was successful in providing even delivery at the orifice 4.

Referring to FIG. 5, this illustrates a pneumatic conveyor pipe 7 leading to the transformation piece 6 mounted above a leaf threshing machine 15. The machine 15 includes a rotor 16 that acts to tear the lamina from the stems as the leaves pass therethrough in the air stream. The threshed leaves issue through a mouthpiece 4 and pass, for example, to a machine in which the stems are separated from the lamina.

It will be seen that the pneumatic conveyor involves a horizontal and a vertical bend 8, 17 respectively, and in order to ensure that the stems and lamina are delivered in an orderly manner through the mouthpiece 4, an air directing vane 11, similar to that illustrated in FIGS. 3 and 4 is mounted in the pipe as shown. It has been found that a blade mounted as indicated in FIG. 5 can readily be directed by bending and twisting to counteract eddy currents set up by the bends 8, 17. If however the lamina and stems do not issue in an orderly manner with a single vane as illustrated, then a second vane can be mounted to deal separately with the eddy currents set up by the bend 17.

What we claim is:

1. An air directing vane for counteracting eddy currents created by a bend in a conduit of a fluid conveyer comprising, a blade mounted in the conduit, said blade extending longitudinally of the said conduit and twisted laterally about its own axis, and a bar means attached to the blade and extending through a hole in the wall of the conduit for attaching the blade to the exterior surface of the conduit.

2. A pneumatic conveyer having a conduit which has at least one bend tending to set up eddy currents downstream thereof, an air directing vane for counteracting eddy currents created by a bend in a conduit of a fluid conveyor comprising a blade mounted in the conduit, said blade extending longitudinally of the said conduit and twisted laterally about its own axis, and bar means attached to the blade and extending through a hole in the wall of the conduit for attaching the blade to the exterior surface of the conduit.

3. A pneumatic conveyor system comprising a pneumatic conveyor for transporting solid material by an air stream, a tangential separator for separating the solid material from the air stream, said pneumatic conveyor connected to the entrance of said separator, the pneumatic conveyor having a conduit which has at least one bend tending to set up eddy currents downstream thereof, an air directing vane for counteracting eddy currents created by a bend in a conduit of a fluid conveyor comprising a blade mounted in the conduit, said blade extending longitudinally of the said conduit and twisted laterally about its own axis, and bar means attached to the blade and extending through a hole in the wall of the conduit.

4. An air directing vane for counteracting eddy currents created downstream from a bend in a fluid conveyor conduit comprising, a blade mounted in the conduit on the side of the conduit which forms the inside of the bend, said blade extending longitudinally of said conduit and twisted laterally about its own axis, said axis being located on the side of the conduit adjacent the inside of the bend, whereby eddy currents arising because of the bend are counteracted by the said vane.

5. An air directing vane as claimed in claim 4 including a bar means attached to the blade and extending through a hole in the wall of the conduit for attaching the blade to the exterior surface of the conduit.

6. In a pneumatic conveyor having a conduit which has at least one bend tending to set up eddy currents downstream thereof, an air directing vane for counteracting eddy currents created downstream from a bend in a fluid conveyor conduit comprising, a blade mounted in the conduit on the side of the conduit which forms the inside of the bend, said blade extending longitudinally of said conduit and twisted laterally about its axis, said axis being located on the side of the conduit adjacent the inside of the bend, whereby eddy currents arising because of the bend are counteracted by the said vane.

7. A pneumatic conveyor as claimed in claim 6 including a bar means attached to the blade and extending through a hole in the wall of the conduit for attaching the blade to the exterior surface of the conduit.

8. A pneumatic conveyor system comprising a pneumatic conveyor for transporting solid material by an air stream, a tangential separator for separating the solid material from the air stream, said pneumatic conveyor connected to the entrance of the said separator, the pneumatic conveyor having a conduit which has at least one bend tending to set up eddy currents downstream thereof, an air directing vane for counteracting eddy currents created downstream from a bend in a fluid conveyor conduit comprising, a blade mounted in the conduit on the side of the conduit which forms the inside of the bend, said blade extending longitudinally of said conduit and twisted laterally about its own axis, said axis being located on the side of the conduit adjacent the inside of the bend, whereby eddy currents arising because of the bend are counteracted by the said vane.

9. A pneumatic system as claimed in claim 8 including a bar means attached to the blade and extending through a hole in the wall of the conduit for attaching the blade to the exterior surface of the conduit.

References Cited by the Examiner

UNITED STATES PATENTS

| | | | |
|---|---|---|---|
| 875,414 | 12/1907 | Dickson et al. | 302—14 |
| 1,058,431 | 4/1931 | Hilliard | 302—14 |

FOREIGN PATENTS

| | | |
|---|---|---|
| 879,973 | 6/1953 | Germany. |

ANDRES H. NIELSEN, *Primary Examiner.*